United States Patent
Wen

(10) Patent No.: US 10,922,126 B2
(45) Date of Patent: *Feb. 16, 2021

(54) CONTEXT PROCESSING METHOD AND APPARATUS IN SWITCHING PROCESS OF MULTIPLE VIRTUAL MACHINES, AND ELECTRONIC DEVICE

(71) Applicant: CloudMinds (Shenzhen) Robotics Systems Co., Ltd., Shenzhen (CN)

(72) Inventor: Yanfei Wen, Shenzhen (CN)

(73) Assignee: CLOUDMINDS (SHENZHEN) ROBOTICS SYSTEMS CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 16/456,855

(22) Filed: Jun. 28, 2019

(65) Prior Publication Data
US 2019/0324788 A1 Oct. 24, 2019

Related U.S. Application Data

(63) Continuation of application No. PCT/CN2016/112829, filed on Dec. 29, 2016.

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
CPC .............. G06F 9/45558; G06F 2009/4557
See application file for complete search history.

(56) References Cited

U.S. PATENT DOCUMENTS

| 6,496,847 B1 | 12/2002 | Bugnion et al. |
| 2015/0370590 A1 | 12/2015 | Tuch et al. |
| 2015/0370592 A1* | 12/2015 | Tuch ................... G06F 9/45558 718/1 |

FOREIGN PATENT DOCUMENTS

| CN | 104025050 A | 9/2014 |
| CN | 104598294 A | 5/2015 |

OTHER PUBLICATIONS

PCT International Search Report and Written Opinion dated Sep. 18, 2017 in corresponding Application No. PCT/CN2016/112829, 12 pages.

* cited by examiner

*Primary Examiner* — Wissam Rashid
(74) *Attorney, Agent, or Firm* — Dilworth IP, LLC

(57) ABSTRACT

The present application provides a context processing method and apparatus in a switching process of multiple virtual machines, and an electronic device. The method includes: in a KVM module, receiving a switching request of switching from a first Hypervisor to a second Hypervisor; in the KVM module, triggering an exception to the first Hypervisor; and in the first Hypervisor, storing a context of the first Hypervisor in a specified location, and loading the pre-stored context of the second Hypervisor. By adoption of the solution provided by the present application, multiple virtual machines can be run simultaneously, and the respective functions can be run independently.

4 Claims, 6 Drawing Sheets

CONTEXT PROCESSING METHOD AND APPARATUS IN SWITCHING PROCESS OF MULTIPLE VIRTUAL MACHINES, AND ELECTRONIC DEVICE

CROSS-REFERENCE TO RELATED APPLICATION

The present application is a continuation application under 35 U.S.C. § 120 of PCT application No. PCT/CN2016/112829 filed on Dec. 29, 2016, the contents of which are incorporated herein by reference.

FIELD OF THE INVENTION

The present invention relates to the field of virtualization technology, and in particular, it is related to a context processing method and apparatus in a switching process of multiple virtual machines, and an electronic device.

BACKGROUND OF THE INVENTION

The KVM (Kernel Virtual Machine) technology is an open source virtualization solution, FIG. 1 shows an architecture schematic diagram of a virtualization solution based on the KVM technology in the prior art, as shown in the figure, it is generally composed of a host (Host) operating system and several virtual guest (Guest) operating systems, and these operating systems are operated on the same set of hardware processor chips and shared processors and peripheral resources.

An ARM processor supporting the virtualization architecture at least includes three modes: EL (Exception Level) 2, EL1 and EL0. The Hypervisor program is run in the EL2 mode, the Linux kernel program is run in the EL1 mode, and the user space program (Application of User mode) is run in the EL0 mode. The Hypervisor layer manages overall hardware resources such as CPU, memory, timers, and interrupts, and is responsible for loading and running operating system on the physical processors time-divisionally, there is an independent set processor resource from each operating system point of view, and operating systems are scheduled by turns. It looks like that one set of processor is able to run several operating system at the same time, this is so calling system virtualization technique.

Generally the virtualization platform only supports its own hypervisor software architecture, and it is difficult to merge third party hypervisor code together.

SUMMARY OF THE INVENTION

One object of the embodiment of the present application is to solve the technical problem in the prior art that a virtualization solution can only execute one Platform Hypervisor on a Hypervisor layer and cannot execute third party Hypervisor software.

In a first aspect, the embodiment of the present application provides a context processing method in a switching process of multiple virtual machines, including:

in a KVM module, receiving a switching request of switching from a first Hypervisor to a second Hypervisor;

in the KVM module, triggering an exception to the first Hypervisor; and in the first Hypervisor, storing a context of the first Hypervisor in a specified location, and loading the pre-stored context of the second Hypervisor.

In a second aspect, the embodiment of the present application provides a context processing apparatus in a switching process of multiple virtual machines, including:

a receiving module configured to, in a KVM module, receive a switching request of switching from a first Hypervisor to a second Hypervisor;

a virtual machine switching module Hypervisor switcher configured to, in the KVM module, trigger an exception to the first Hypervisor; and a swapping interface module swap entry configured to, in the first Hypervisor, store a context of the first Hypervisor in a specified location, and load the pre-stored context of the second Hypervisor.

In a third aspect, the embodiment of the present application provides an electronic device, including: a memory, one or more processors, and one or more modules, wherein the one or more modules are stored in the memory and are configured to be executed by the one or more processors, and the one or more modules include instructions for executing each step in the method described above.

In a fourth aspect, the embodiment of the present application provides a computer program product combined with an electronic device for use, wherein the computer program product includes a computer program embedded in a computer readable storage medium, and the computer program includes instructions for causing the electronic device to execute each step in the method described above.

The beneficial effects are as follows:

In the embodiment of the present application, a function module for switching and a function module for context processing are added on the basis of the existing virtualization architecture, after the switching request of switching from the first Hypervisor to the second Hypervisor is received in the KVM module, the exception can be triggered to the first Hypervisor, the context of the first Hypervisor is stored in the specified location in the first Hypervisor, and the pre-stored context of the second Hypervisor is loaded to achieve the context management of the Hypervisors, thereby implementing the dynamic switching running of the Hypervisor software, and even if the hardware supports only one virtualization extension, multiple virtual machines can be run simultaneously, and the respective functions can be run independently.

BRIEF DESCRIPTION OF THE DRAWINGS

Specific embodiments of the present application will be described below with reference to the drawings, in which.

DETAILED DESCRIPTION OF THE EMBODIMENTS

In order that the technical solutions and advantages of the present application are clearer, a further detailed description of the exemplary embodiments of the present application will be given below in combination with the drawings. Apparently, the embodiments described below are merely a part, but not all, of the embodiments of the present application. Furthermore, the embodiments in the description and the features in the embodiments can be combined with each other without conflicts.

The inventor noticed during the invention process that:

In the prior art, a KVM/Hypervisor module spans two layers, that is, Host Linux kernel and Hypervisor, thereby providing an interface node for Qemu and allowing the Qemu to create a virtual CPU through a KVM node to manage virtualization resources on one hand; and on the other hand, the KVM/Hypervisor switches a Host Linux system out from a physical CPU, then loads a Guest Linux system onto a physical processor for running, and finally processes subsequent transactions of abnormal exit of the Guest Linux system.

Qemu, running as an application of Host Linux, provides virtual hardware device resources for the running of the Guest Linux, creates the virtual CPU through the device KVM node of the KVM/Hypervisor module, allocates physical hardware resources, and loads an unmodified Guest Linux to a physical hardware processor for running.

Through the above description, in order to achieve virtualization on a hardware platform, a very critical function to be implemented on a Hypervisor layer is to perform onsite protection on a running context of the operating system currently running on the physical hardware and then restore the running context of another operating system onto the physical hardware and to start the code execution, thereby achieving the dynamic switching running of the operating systems. If one hardware platform has implemented more complex logic functions on the Hypervisor layer and does not support a virtualization function, it would be very difficult to run the virtualization software on such a platform.

The existing mobile platform software has run very complicated logic, the existing software has occupied the physical hardware resources of all Hypervisor layers, such as a stage 2 MMU page table and an exception vector table, and in this case, the third party Hypervisor software does not have any permission or opportunity to be executed on the Hypervisor layer.

In view of the deficiencies of the prior art, the embodiment of the present application proposes a method and apparatus, and an electronic device, which enable multiple virtual machines to run simultaneously and ensure the independent running of respective functions in the case that the hardware supports only one virtualization extension.

The details will be described below.

First Embodiment

Figure 1:
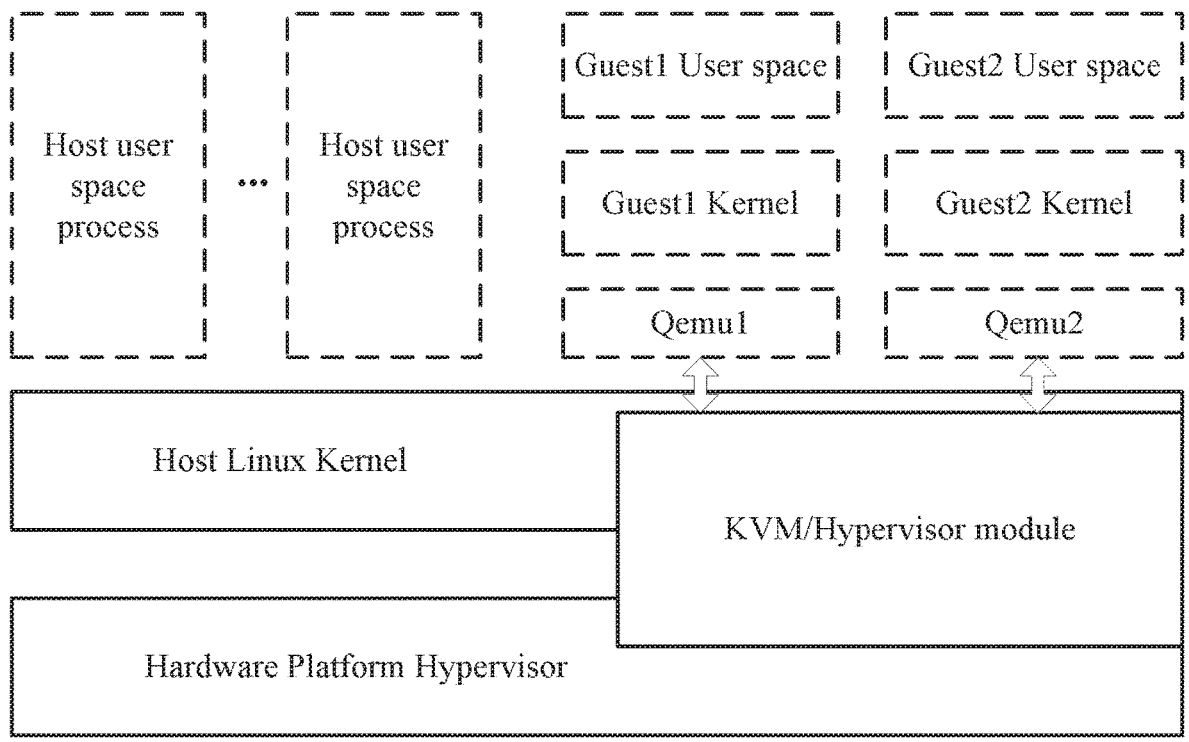
FIG. 1 shows a schematic diagram of a virtualization architecture based on the KVM technology in the prior art.
Figure 2:
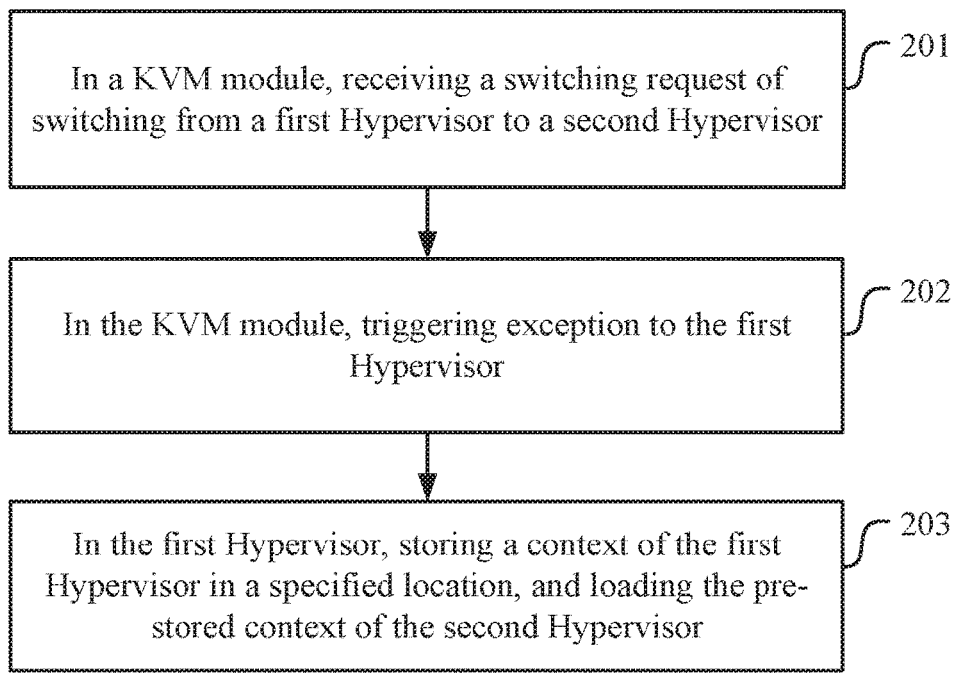
FIG. 2 shows a schematic flow diagram for implementing a context processing method in a switching process of multiple virtual machines in a first embodiment of the present application.

FIG. 2 shows a schematic flow diagram for implementing a context processing method in a switching process of multiple virtual machines in the first embodiment of the present application, and as shown in the figure, the context processing method in the switching process of the multiple virtual machines can include the following steps:

Step 201, in a KVM module, receiving a switching request of switching from a first Hypervisor to a second Hypervisor;

step 202, in the KVM module, triggering an exception to the first Hypervisor; and step 203, in the first Hypervisor, storing a context of the first Hypervisor in a specified location, and loading the pre-stored context of the second Hypervisor.

During specific implementation, a function module Hypervisor Switcher (referred to as Switcher) for switching can be added to the KVM module, the Hypervisor Switcher receives the switching request of switching from the first Hypervisor to the second Hypervisor and is responsible for triggering the switching of the Hypervisor, each Hypervisor can have a function module Hypervisor Swap entry (referred to as Swap entry) for context processing, the Swap entry implements the dynamic switching running of the Hypervisor software, when one Hypervisor needs to be loaded into the CPU for running, and the Switcher executes a code of the Swap entry through an exception call, stores the context of the current Hypervisor, then writes the context of the Hypervisor to be run into a register of the physical hardware CPU and starts the running.

During the specific implementation of loading the pre-stored context of the second Hypervisor, the pre-stored context of the second Hypervisor can be loaded into the register of the CPU, and a progress of the CPU maps a virtual storage space of the progress with the register of the CPU so as to enable the register of the CPU to read the context of the second Hypervisor and to enable the CPU to run the second Hypervisor.

Compared with the existing virtualization architecture solution, the embodiment of the present application increases the functions of the Hypervisor Switcher and the Hypervisor Swap Entry while maintaining the Hypervisor software framework of the original hardware platform unchanged, and implements the simultaneous running of the multiple virtual machines and the dynamic switching running of software on the Hypervisor layer on the basis of single hardware virtualization expansion, thereby supporting the implementation of different upper layer virtual operating systems, that is, independent functions.

The embodiment of the present application can be applied to a case in which the hardware platform is a multi-core processor, and for the multi-core processor, each core can independently run a virtual machine of a different function type.

In an implementation, the first Hypervisor can be a platform Hypervisor, and the second Hypervisor can be a third party Hypervisor; and the in the first Hypervisor, storing a context of the first Hypervisor in a specified location, and loading the pre-stored context of the second Hypervisor can be specifically as follows: in the platform Hypervisor, storing the context of the platform Hypervisor in the specified location of the storage space of the third party Hypervisor, and loading the context of the third party Hypervisor pre-stored in the storage space of the third party Hypervisor.

During specific implementation, the switching request of switching from the platform Hypervisor to the third party Hypervisor is received; and the Hypervisor switcher triggers the exception to the platform Hypervisor, and runs a swap entry module of the platform Hypervisor; and the swap entry module of the platform Hypervisor can trigger a central processing unit, and the central processing unit maps the storage space of the third party Hypervisor, that is, establishes a mapping relationship between a progress virtual space of the central processing unit and the storage space of the third party Hypervisor, then stores the context of the platform Hypervisor in the specified location of the storage space of the third party Hypervisor, and loads the context of the third party Hypervisor pre-stored in the storage space of the third party Hypervisor into the progress of the central processing unit.

In an implementation, the first Hypervisor can be a third party Hypervisor, and the second Hypervisor can be a platform Hypervisor, and the in the first Hypervisor, storing a context of the first Hypervisor in a specified location, and loading the pre-stored context of the second Hypervisor can be specifically as follows: in the third party Hypervisor, storing the context of the third party Hypervisor in the specified location of the storage space of the third party Hypervisor, and loading the context of the platform Hypervisor pre-stored in the storage space of the third party Hypervisor.

During the specific implementation, the switching request of switching from the third party Hypervisor to the platform Hypervisor is received; the Hypervisor switcher triggers the exception to the third party Hypervisor, and runs the swap entry module of the third party Hypervisor; and the swap entry module of the third party Hypervisor can trigger the central processing unit, and the central processing unit stores the context of the third party Hypervisor in the specified location of the storage space of the third party Hypervisor, and loads the context of the platform Hypervisor pre-stored in the storage space of the third party Hypervisor into the progress of the central processing unit.

In an implementation, the method can further include: updating a recording state of the context in the storage space of the third party Hypervisor.

During specific implementation, in the embodiment of the present application, the state of the context in the storage space can be stored, and the recording state of the context can be updated in the storage space after Hypervisor switching.

In an implementation, the data structure form of the storage space can be a stack, and the updating a recording state of the context in the storage space of the third party Hypervisor may be specifically as follows: updating the recording state of the context at the most bottom of a stack space of the third party Hypervisor.

During specific implementation, for the switching process of the Hypervisors, a space can be preset to store the respective contexts of the Hypervisors, in the embodiment of the present application, the contexts of two Hypervisors to be switched can be stored at the bottom of the stack (stack) space of the Hypervisor to be loaded on the CPU, and the context data of the two Hypervisors are sequentially stored upward from a storage location of state data (since the most bottom of the stack space is less commonly used, the state data can be recorded at the most bottom of the stack space).

In an implementation, the third party Hypervisor can be used for switching a Host operating system supported by an upper layer and at least one Guest virtual operating system.

During specific implementation, the platform Hypervisor can be a Qualcomm Platform Hypervisor or the like, and the third party Hypervisor can be a Xen architecture Hypervisor, a KVM Hypervisor or the like.

Second Embodiment

Based on the same inventive concept, the embodiment of the present application further provides a context processing apparatus in a switching process of multiple virtual machines. Since the principle of these devices to solve the problem is similar to the context processing method in the switching process of multiple virtual machines, the implementation of these devices can refer to the implementation of the method, and repeated parts are not repeatedly described herein.

Figure 3:
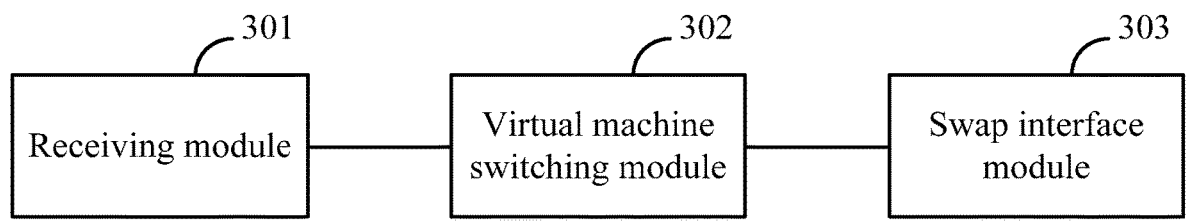
FIG. 3 shows a structural schematic diagram of a context processing apparatus in a switching process of multiple virtual machines in a second embodiment of the present application.

FIG. 3 shows a structural schematic diagram of a context processing apparatus in a switching process of multiple virtual machines in the second embodiment of the present application, and as shown in the figure, the context processing apparatus in the switching process of multiple virtual machines can include the following components:

a receiving module 301 configured to, in a KVM module, receive a switching request of switching from a first Hypervisor to a second Hypervisor;

a virtual machine switching module Hypervisor switcher 302 configured to, in the KVM module, trigger an exception to the first Hypervisor; and a swapping interface module swap entry 303 configured to, in the first Hypervisor, store a context of the first Hypervisor in a specified location, and load the pre-stored context of the second Hypervisor.

In an implementation, the first Hypervisor can be a platform Hypervisor, and the second Hypervisor can be a third party Hypervisor; and the swap entry module of the platform Hypervisor can be specifically configured to: in the platform Hypervisor, store the context of the platform Hypervisor in the specified location of the storage space of the third party Hypervisor, and load the context of the third party Hypervisor pre-stored in the storage space of the third party Hypervisor.

In an implementation, the first Hypervisor can be a third party Hypervisor, and the second Hypervisor can be a platform Hypervisor, and the swap entry module of the third party Hypervisor can be specifically configured to: in the third party Hypervisor, store the context of the third party Hypervisor in the specified location of the storage space of the third party Hypervisor, and load the context of the platform Hypervisor pre-stored in the storage space of the third party Hypervisor.

In an implementation, the apparatus can further include:

a recording module, configured to update a recording state of the context in the storage space of the third party Hypervisor.

In an implementation, the data structure form of the storage space can be a stack, and the recording module can be specifically configured to update the recording state of the context at the most bottom of a stack space of the third party Hypervisor.

In an implementation, the third party Hypervisor is used for switching a Host operating system supported by an upper layer and at least one Guest virtual operating system.

For the convenience of description, various parts of the above described apparatus are divided into various modules or units according to the functions to be described respectively. Of course, the functions of the modules or units can be implemented in the same one or more software or hardware during the implementation of the present application.

Third Embodiment

Based on the same inventive concept, the embodiment of the present application further provides an electronic device, which will be described below.

Figure 4:
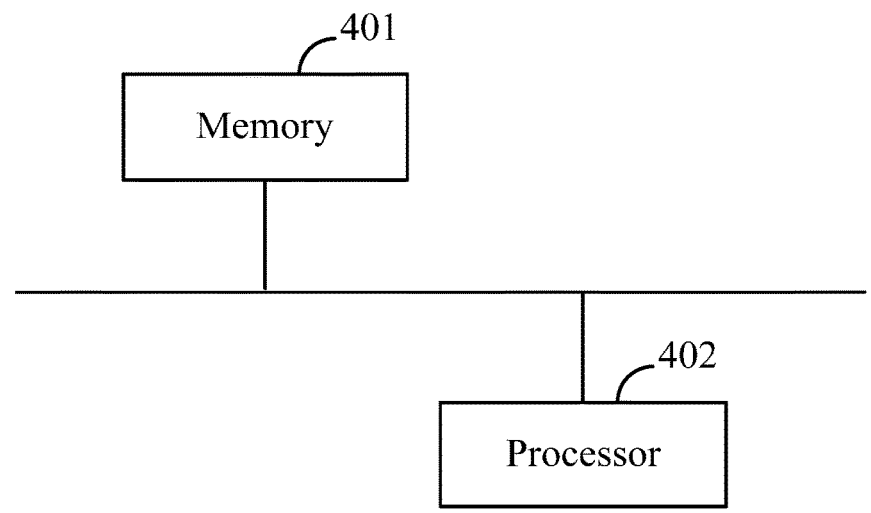
FIG. 4 shows a structural schematic diagram of an electronic device in a third embodiment of the present application.

FIG. 4 shows a structural schematic diagram of an electronic device in the third embodiment of the present application, and as shown in the figure, the electronic device can include: a memory 401, one or more processors 402, and one or more modules; and the one or more modules are stored in the memory 402 and are configured to be executed by the one or more processors 402, and the one or more modules include instructions for executing each step in the context processing method in the switching process of multiple virtual machines described above.

In an implementation, the electronic device can be a robot.

During specific implementation, the electronic device can be a mobile phone, a pad, a tablet computer, a personal computer PC, an intelligent robot or other product.

In an implementation, the electronic device can further include: a display screen, the display screen can be used for displaying a graphical user interface, and the display screen can specifically be a Touch screen or a non-touch screen.

In the electronic device provided by the embodiment of the present application, the Hypervisor Switcher module is responsible for triggering the switching of different Hypervisors, and the Hypervisor swap entry module is responsible for the context management of the Hypervisors, thereby realizing the dynamic switching running of the Hypervisor software, and even if the hardware supports only one virtualization extension, multiple virtual machines can be run simultaneously, and the respective functions can be run independently.

Fourth Embodiment

Based on the same inventive concept, the embodiment of the present application further provides a computer program product combined with an electronic device for use, which will be described below.

The computer program product combined with the electronic device for use provided by the embodiment of the present application includes: a computer program embedded in a computer readable storage medium, and the computer program includes an instruction for causing the electronic device to execute each step in the context processing method in the switching process of multiple virtual machines described above.

In order to facilitate the implementation of the present application, the following description will be made by way of example.

Fifth Embodiment

The embodiment of the present application is described by taking the virtualization architecture of the Linux Kernel as an example, including a Platform Hypervisor and a KVM Hypervisor.

Figure 5:
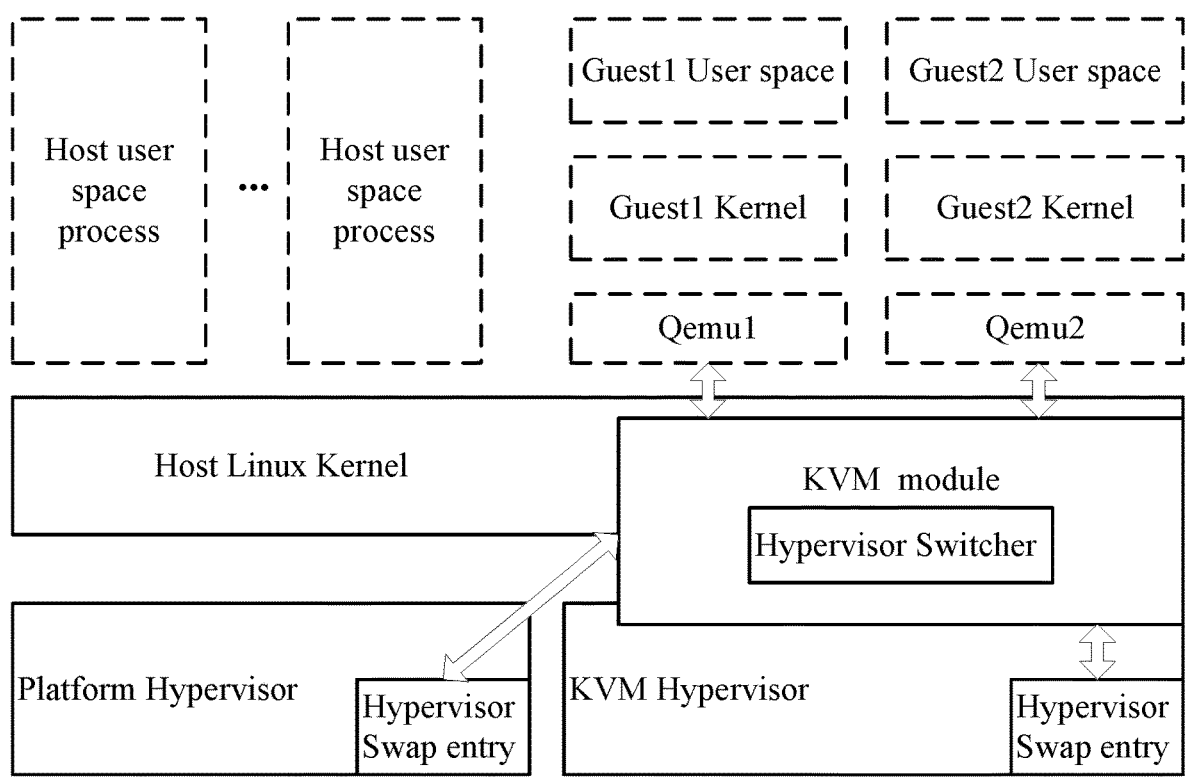
FIG. 5 shows a schematic diagram of a virtualization architecture in a fifth embodiment of the present application.

FIG. 5 shows a schematic diagram of a virtualization architecture in the fifth embodiment of the present application, as shown in the figure, compared with the virtualization architecture solution in the prior art, the embodiment of the present application has the advantages of integrating a part of software codes of a Linux open source Hypervisor on the basis of maintaining the Hypervisor software framework of the original hardware platform unchanged, and respectively adding the functions of Hypervisor Switcher and Hypervisor Switcher Entry on the architecture diagram to realize the dynamic switching running of software on the Hypervisor layer.

The Switcher is responsible for the dynamic switching running of the Hypervisors of different functions, for example, a Qualcomm Platform Hypervisor, a Xen architecture Hypervisor, a KVM Hypervisor, and so on. The Hypervisor itself implements the switching of the operating system supported by the upper layer, for example, the KVM Hypervisor is responsible for the switching running of Host Linux and multiple Guest Linux virtual operating systems. By adoption of the technical solution provided by the embodiment of the present application, multiple virtual machines can be simultaneously run on the basis of single hardware virtualization extension to support the implementation of different upper layer virtual operating systems and independent functions.

Figure 6:
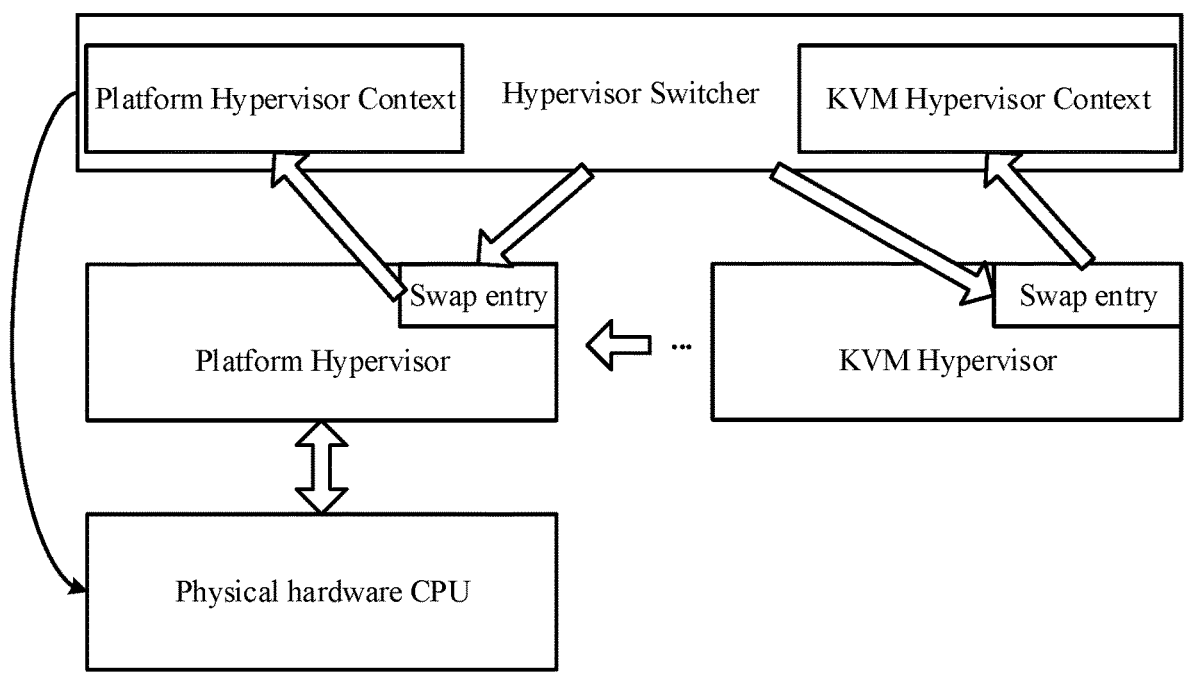
FIG. 6 shows a schematic diagram of dynamic switching running of Hypervisors in the fifth embodiment of the present application.

FIG. 6 shows a schematic diagram of dynamic switching running of Hypervisors in the fifth embodiment of the present application, as shown in the figure, the Hypervisor switcher is responsible for triggering the switching of the Hypervisors, and each Hypervisor has a Swap entry. The Switcher implements the dynamic switching running of the Hypervisor software through the Swap entry, when one Hypervisor needs to be loaded into the CPU for running, the Switcher executes the code of the Swap entry by an exception call, stores the context of the current Hypervisor, then writes the context of the Hypervisor to be run in the register of the physical hardware CPU, and starts the running.

Figure 7:
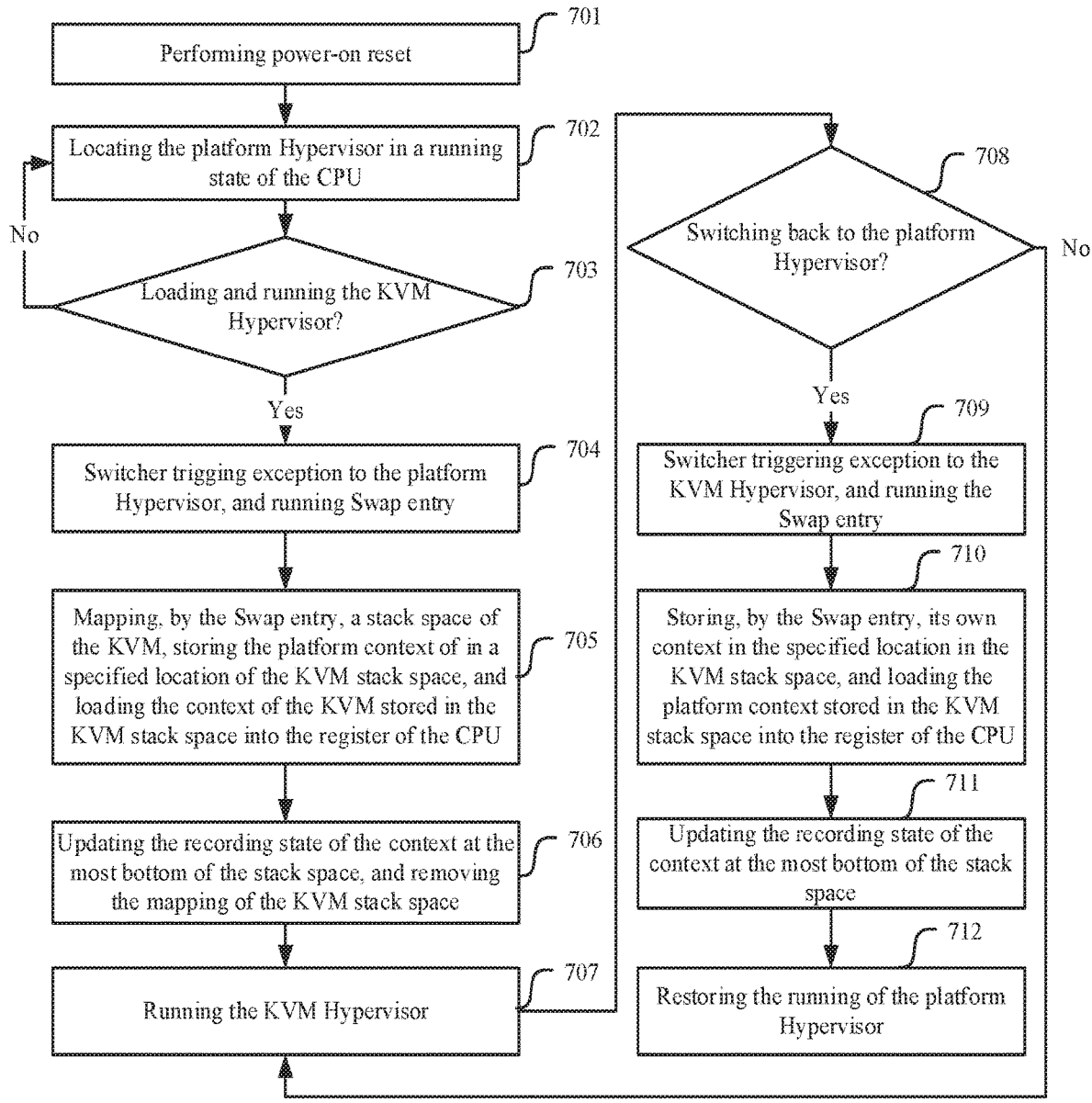
FIG. 7 shows a schematic flow diagram of dynamic switching running of Hypervisors in the fifth embodiment of the present application.

FIG. 7 shows a schematic flow diagram of dynamic switching running of Hypervisors in the fifth embodiment of the present application, and as shown in the figure, the specific processes can be as follows:

Step 701, performing power-on reset;

step 702, locating the platform Hypervisor in a running state of the CPU;

step 703, judging whether to load and run the KVM Hypervisor:

if yes, skipping to step 704; otherwise, continuing to execute step 702.

step 704, Hypervisor switcher triggering an exception to the platform Hypervisor, and running a Swap entry code;

step 705, mapping, by the Swap entry code, a stack space of the KVM, storing the context of the current platform in a specified location, and loading the context of the KVM Hypervisor stored in the KVM stack space into the register of the CPU at the same time;

step 706, updating the recording state of the context at the most bottom of the stack space, and removing the mapping of the KVM stack space;

step 707, starting to run the KVM Hypervisor;

step 708, judging whether to switch back to the platform Hypervisor:

if yes, skipping to step 709; otherwise, continue to execute step 707;

step 709, Hypervisor switcher triggering an exception to the KVM Hypervisor in the same method, and running the Swap entry code;

step 710, storing, by the Swap entry, its own context in the specified location in the KVM stack space, and loading the platform context stored in the KVM stack space into the register of the CPU at the same time;

step 711, updating the recording state of the context at the most bottom of the stack space; and step 712, restoring the running of the platform Hypervisor.

Sixth Embodiment

The embodiment of the present application is described by taking a multi-core processor as an example.

Figure 8:
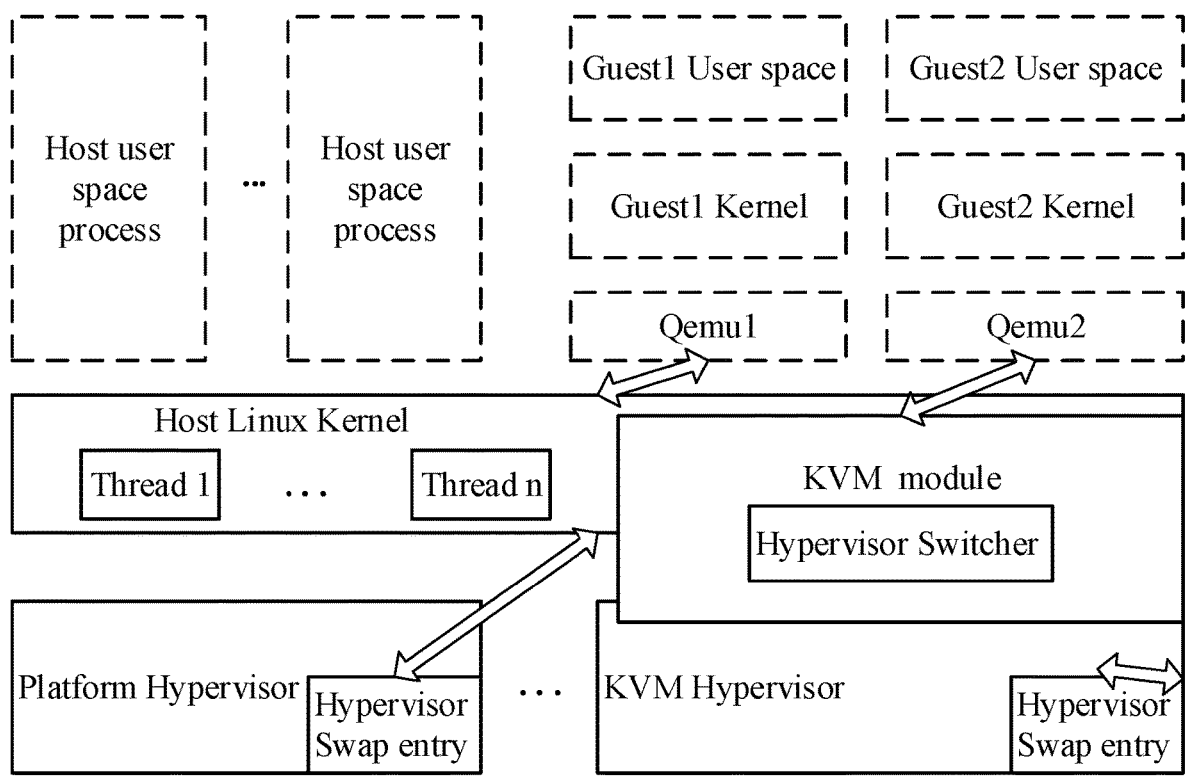
FIG. 8 shows a schematic diagram of a virtualization architecture of a multicore processor in a sixth embodiment of the present application.

FIG. 8 shows a schematic diagram of a virtualization architecture of a multicore processor in a sixth embodiment of the present application, as shown in the figure, the multi-core processor can be a Linux Kernel including multiple threads, and each core independently runs one virtual machine during implementation.

The Hypervisor layer can include several different Hypervisors, such as a Platform Hypervisor, a Xen architecture Hypervisor, a KVM Hypervisor, a Linux Containers (LXC), and so on.

When these Hypervisors need to be switched, for example, switching from the Platform Hypervisor to the Xen architecture Hypervisor, switching from the Xen architecture Hypervisor to the KVM Hypervisor and the like, and the Hypervisor Switcher is responsible for triggering the exception of the currently running Hypervisor and running the Swap entry module of the currently running Hypervisor.

The Swap entry module of the currently running Hypervisor stores the context of the currently running Hypervisor in the specified location, loads the context of the target Hypervisor stored in the specified location into the register of the CPU, and updates the recording state of the context.

The specified location can be a space of a Hypervisor such as the Platform Hypervisor, the Xen architecture Hypervisor, the KVM Hypervisor, the Linux Containers (LXC) or the like, the specific data structure can be a stack and can also be other data structure forms (for example, an array, a queue and the like) as long as a data access function is available. During the specific implementation, multiple data structures can be provided, for example: two stacks, one stack is used for storing the context of the Platform Hypervisor, the other stack is used for storing the context of the KVM Hypervisor and the like, and the recording state of the context can be at the bottom of any stack.

Those skilled in the art should be aware that the embodiment of the present application can be provided as a method, a system or a computer program product. Thus, the present application can take the form of an entirely hardware embodiment, an entirely software embodiment, or an embodiment combining software with hardware. Moreover, the present application can take the form of a computer program product implemented on one or more computer usable storage media (including, but not limited to, a disk memory, a CD-ROM, an optical memory and the like) including computer usable program codes.

The present application is described with reference to the flowcharts and/or block diagrams of the method, device (system) and the computer program product according to the embodiments of the present application. It should be understood that each flow and/or block in the flowcharts and/or block diagrams, and combinations of the flows and/or blocks in the flowcharts and/or block diagrams can be implemented by computer program instructions. These computer program instructions can be provided to a processor of a general purpose computer, a special purpose computer, an embedded processor or other programmable data processing devices to produce a machine, so that instructions executed by the processors of the computers or other programmable data processing devices generate an apparatus for implementing specified functions in one or more flows in the flowcharts and/or one or more blocks in the block diagrams.

These computer program instructions can also be stored in a computer readable memory capable of guiding the computers or the other programmable data processing devices to work in particular manners, such that the instructions stored in the computer readable memory generate products including instruction apparatuses, and the instruction apparatuses achieve the specified functions in one or more flows of the flowcharts and/or one or more blocks of the block diagrams.

These computer program instructions can also be loaded on the computers or the other programmable data processing devices, to execute a series of operation steps on the computers or the other programmable data processing devices to produce processing achieved by the computers, such that the instructions executed on the computers or the other programmable data processing devices provide steps used for achieving the specified functions in one or more flows of the flowcharts and/or one or more blocks of the block diagrams.

Although the preferred embodiments of the present application have been described, those skilled in the art can make additional changes and modifications to these embodiments once knowing the basic creative concepts. Therefore, the appended claims are intended to be interpreted as including the preferred embodiments and all changes and modifications falling within the scope of the present application.

The invention claimed is:

1. A context processing method in a switching process of multiple virtual machines, comprising:
    in a Kernel Virtual Machine (KVM) module, receiving a switching request of switching from a third party Hypervisor to a platform Hypervisor, the third party Hypervisor being a Hypervisor other than the platform Hypervisor;
    in the KVM module, triggering an exception to the third party Hypervisor; and
    in the third party Hypervisor, storing a context of the third party Hypervisor in a specified location of a storage space of the third party Hypervisor, and loading the context of the platform Hypervisor pre-stored in the storage space of the third party Hypervisor; and
    wherein a data structure form of the storage space is a stack, the method further comprising updating a recording state of the context at the most bottom of a stack space of the third party Hypervisor.

2. A context processing method in a switching process of multiple virtual machines, comprising:
    in a Kernel Virtual Machine (KVM) module, receiving a switching request of switching from a platform Hypervisor to a third party Hypervisor, the third party Hypervisor being a Hypervisor other than the platform Hypervisor;
    in the KVM module, triggering an exception to the platform Hypervisor; and
    in the platform Hypervisor, storing a context of the platform Hypervisor in a specified location of a storage space of the third party Hypervisor, and loading the context of the third party Hypervisor pre-stored in the storage space of the third party Hypervisor; and
    wherein a data structure form of the storage space is a stack, the method further comprising updating a recording state of the context at the most bottom of a stack space of the third party Hypervisor.

3. An electronic device, comprising: a memory, one or more processors, and one or more modules;

wherein the one or more modules are stored in the memory and are configured to be executed by the one or more processors, and the one or more modules comprise instructions for executing each of the following steps:

in a Kernel Virtual Machine (KVM) module, receiving a switching request of switching from a platform Hypervisor to a third party Hypervisor;

in the KVM module, triggering an exception to the first Hypervisor; and in the first Hypervisor, storing a context of the first Hypervisor in a specified location, and loading a pre-stored context of the second Hypervisor, wherein one of the first and second Hypervisors is a platform Hypervisor and another one of the first and second Hypervisors is a third party Hypervisor, the third party Hypervisor being a Hypervisor other than the platform Hypervisor;

wherein said in the first Hypervisor, storing a context of the first Hypervisor in a specified location, and loading the pre-stored context of the second Hypervisor is specifically as follows: in the platform Hypervisor, storing the context of the platform Hypervisor in the specified location of a storage space of the third party Hypervisor, and loading the context of the third party Hypervisor prestored in the storage space of the third party Hypervisor if the first Hypervisor is the platform Hypervisor, and the second Hypervisor is the third party Hypervisor;

the method further comprising updating a recording state of the context in the storage space of the third party Hypervisor;

wherein a data structure form of the storage space is a stack, and said updating a recording state of the context in the storage space of the third party Hypervisor is specifically as follows: updating the recording state of the context at the most bottom of a stack space of the third party Hypervisor.

4. The electronic device according to claim 3, wherein said in the first Hypervisor, storing a context of the first Hypervisor in a specified location, and loading the pre-stored context of the second Hypervisor is specifically as follows: in the third party Hypervisor, storing the context of the third party Hypervisor in the specified location of a storage space of the third party Hypervisor, and loading the context of the platform Hypervisor pre-stored in the storage space of the third party Hypervisor if the first Hypervisor is the third party Hypervisor and the second Hypervisor is the platform Hypervisor.

* * * * *